Nov. 10, 1959 E. H. MUNDELL ET AL 2,911,728
COMPARISON GAUGE FOR ARCUATE SURFACES
Filed March 14, 1957
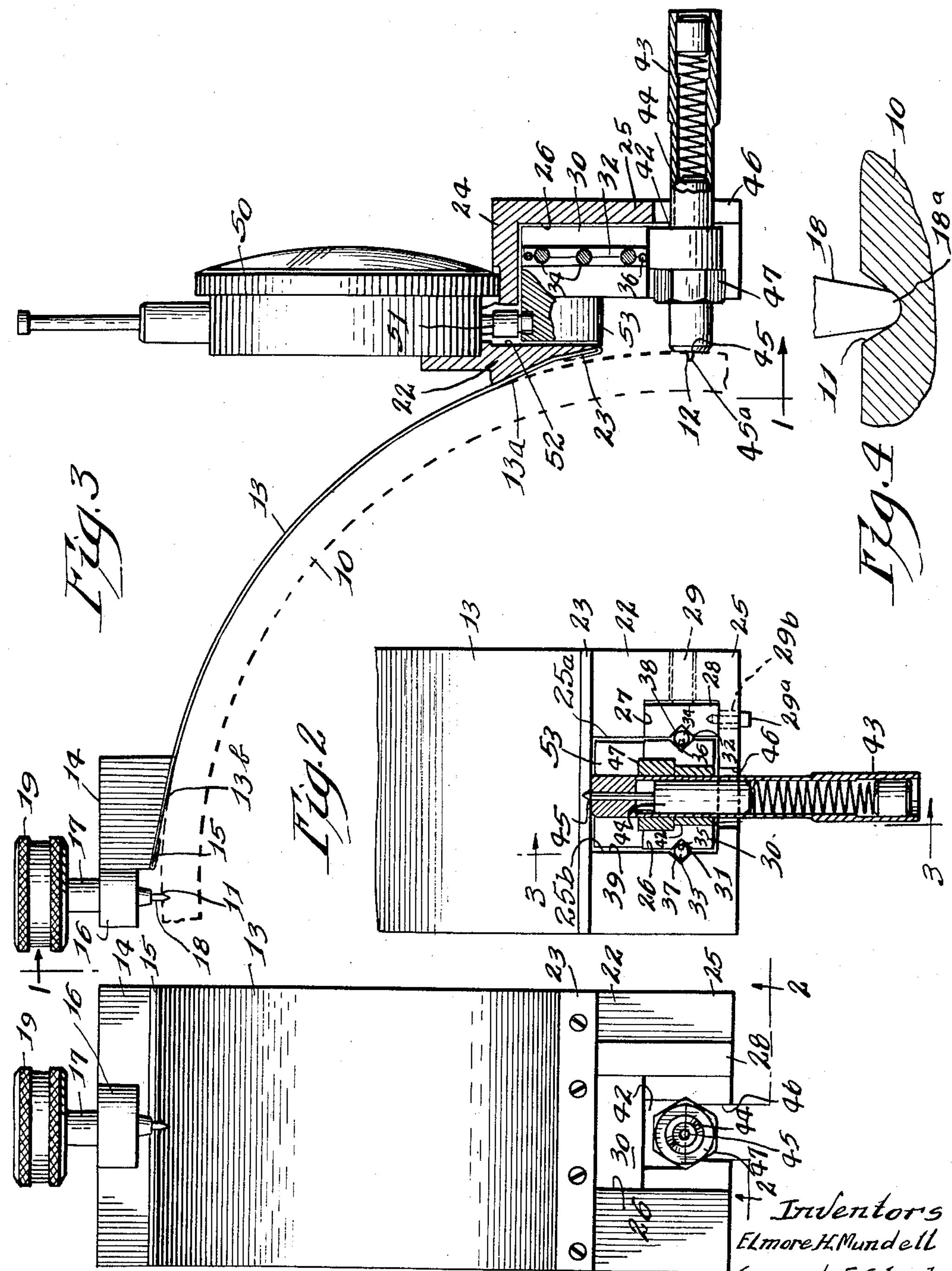

2,911,728
Patented Nov. 10, 1959

2,911,728

COMPARISON GAUGE FOR ARCUATE SURFACES

Elmore H. Mundell, Gary, Ind., and Gunnard E. Stark, Lake Forest, Ill., assignors to R. R. Donnelley & Sons Company, a corporation of Delaware Application March 14, 1957, Serial No. 646,037

7 Claims. (Cl. 33—174)

This invention relates to a gauging device, and more particularly to a gauging device for comparing lengths along arcuate surfaces.

In high-grade, multi-color printing, it is extremely important that there be very accurate registration between the four electrotype color plates of a multi-color set to insure their registry during the printing operation. For high-grade color reproduction, the permissible variation in the lengths of the printing surfaces of the four plates of a set cannot exceed about .006 inch, and the critical red plate must be held within .004 inch of the length of the master plate or half the diameter of a row of dots on a 120-line, half-tone screen. The arcuate shape of the plates makes it quite difficult to accurately determine the relative lengths of the printing surfaces of the plates of a set.

Applicants have developed a gauging device for such arcuate surfaces with which the relative plate lengths may be easily determined with the requisite degree of accuracy.

It is, therefore, the principal object of the present invention to provide a new and improved gauging device for accurately comparing the distance between pairs of index points on two or more arcuate surfaces of equal radius. The principal use of the invention is in comparing two or more printing plates of a set to determine whether their dimensions come within allowable limits.

Another object of the invention is to provide such a gauging device having an index pin and a gauging pin which are adjustable as to depth to compensate for variations in the radii of curvature of plates in different sets, and in the depth of reference recesses formed in the different plates.

A further object of the invention is to provide for adjustment of the gauge to varying lengths within the range of the gauge.

A still further object of the invention is to provide such a gauging device wherein the index and gauging pins engage the index recesses normal to planes tangent thereto for maximum accuracy of measurement.

The invention is illustrated in a preferred embodiment in the accompanying drawings, in which:

Fig. 1 is a rear elevational view of a device embodying the invention, taken substantially as indicated along the line 1—1 of Fig. 3;

Fig. 2 is a fragmentary bottom plan view partially in section, taken as indicated along the line 2—2 of Fig. 1 with the gauging pin being shown in gauging position;

Fig. 3 is a side elevational view partially in section as seen along line 3—3 of Fig. 2, the device being shown in position on an electrotype plate which is illustrated in broken lines; and Fig. 4 is a fragmentary enlarged sectional view of the index pin in the gauging recess.

The use of this gauging device is best shown in Fig. 3 wherein the distance along an arcuate, convex surface of a cylindrical member 10 (shown in broken lines) between first and second index recesses or reference points 11 and 12 is being determined.

As shown in the drawings, the gauging device includes a thin, metallic band, or strap 13, which is relatively wide and thus is very flexible about axes extending transversely across the surface of the band 13 and relatively inflexible about axes normal to the surface of the band 13.

In order to anchor one end of the gauging device to the arcuate surface to be measured, a fixed index member 14 is rigidly secured to one end 15 of the band 13. The index member 14 has an overhanging bushing 16 which threadably carries an index shaft 17 having a conical pin 18 with a ball-end point **18*a* which is engageable in the index recess 11, and a knob 19 for adjusting the depth of pin 18. As seen in Fig. 4, pin 18 must have a recess engaging surface which is a segment of a sphere, so that it has surface contact with recess 11. Thus its tip 18*a* may be spherical except for its area of attachment to the pin, or it may be a hemisphere on the end of a frustum of a cone which does not contact any part of the recess. Thus, the index shaft 17 can be adjusted to the proper depth for a particular index recess, and plate radius so as to locate the index shaft 17** normal to a plane tangent to the arcuate surface at that point—i.e., on the projected radius of the cylinder—for accuracy of measurement.

A body member 22 is rigidly secured to the other end 23 of the band 13 and includes a flange portion 24 extending away from the band 13 and a depending portion 25 which has sides **25*a* and 25*b* defining a channel 26 which opens away (downwardly in Fig. 3) from the end 23 of the band 13**.

As best shown in Fig. 2, a recess 27 is formed in side **25*a* communicating with channel 26, and in said recess is fitted a bearing take-up block 28, an adjusting set screw 29 is threadably mounted in the body member 22 to adjust block 28, and a locking screw 29*a* is mounted in an elongated slot 29*b* and engages a threaded hole in the block 28 for locking said block in its adjusted position. A movable gauging member 30 is disposed in the channel 26 and has V grooves 31 and 32 formed in its opposite sides in each of which grooves a plurality of ball bearings 33 and 34 are retained, respectively, by retainers 35 and 36. Thus, the gauging member 30 is freely movable in the channel 26 with the ball bearings 33 and 34 being disposed in mating V grooves 37 and 38 formed, respectively, in side 25*b* of the body 22, and in the inner face of the take-up block 28**.

As best shown in Figs. 1 and 3, the movable gauging member 30 has a depending hollow boss 42 the opening of which is threaded and extends normal to the direction of movement of the gauging member 30. Adjustably mounted in said opening is an elongated, externally threaded gauging pin sleeve 43 with an internal, adjustable, spring urged plunger 44 the exposed end of which forms a conical gauging pin 45 which has a ball-end point **45*a* adapted to engage the index recess 12 on the arcuate surface to be measured. The pin sleeve 43 extends outwardly from the body member 22 through a vertical slot 46 formed in the front face of said depending body portion 25 and carries a lock nut 47 between the gauging pin 45 and the hollow boss 42. This arrangement of parts permits the pin sleeve 43 to be adjusted until the gauging pin 45 is normal to a plane tangent to the arcuate surface when its ball-end point 45*a* is in the index recess 12, and then locks it there so as to insure maximum accuracy of measurement. As seen in Fig. 3, in use the sleeve 43 is depressed into surface engagement with the plate by manual pressure, so that there is a "point" contact by ball-end point 45*a*, coupled with a stabilizing contact by the end of sleeve 43 and a line contact along transverse line 13a of strap 13, where the strap leaves the surface of plate 10 and becomes tangent thereto. This orients the longitudinal axis of pin 45a on a radius of plate 10, and positions movable gauging member 30 where its movement is in a plane parallel to a tangent to the plate at said radius. Similarly, index pin 18 cooperates with the transverse line 13b where strap 13 leaves the plate surface and becomes tangent thereto, and orients the axis of index pin 18** on a radius of the plate. Thus orientation of both ends of the gauging device is readily maintained in use, which provides reproducibility of indications in successive readings on a plate by one or more observers.

Referring now to Fig. 3, an indicating device 50 having the usual calibrated face and an indicator finger is mounted on the flange portion 24 of the body member 22. The indicating device 50 has a finger actuating stem 51 extending through an opening 52 in the flange 24 and longitudinally into the channel 26. The movable gauging member 30 has an integral stem actuating portion 53 secured to the stem 51 to provide an indication on the indicating device 50 of the distance along the arcuate curve between the two index recesses 11 and 12.

In using this gauging device to determine the accuracy of registration of a number of arcuate electrotype plates in a multi-color set, the gauging device is first placed on a master plate, and the reading of the indicating device 50 of the distance along the arcuate surface between the two reference recesses is noted. Then the gauging device is placed on each of the different color plates in the set, and the reading of the indicating device as to the distance on the arcuate surface between the two index recesses is compared with the corresponding reading for the master plate.

With this gauging device, which is very easy to use, it has been found that differences in plate length of .004 inch or half the width of a row of dots on a 120-line, half-tone screen may be detected. With high-grade, multi-color printing, it is necessary to maintain such tolerances for accurate registry of the different color plates.

The foregoing detailed description is given for clearness of understanding only, and no unnecessary limitations are to be understood therefrom, as some modifications will be obvious to those skilled in the art.

We claim:

1. A comparison gauge for convex surfaces of arcuate plates, comprising: an elongated strap which is flexible only about axes perpendicular to its length; an index pin secured to one end of said strap and adapted to be anchored in a first index recess on a convex surface of an arcuate plate, said index pin being movable about an axis of flexibility of the strap and axially adjustable with respect to the strap to position its longitudinal axis on a projected radius of said plate when it is in said index recess; a body member secured to the opposite end of said strap and pivotable on an axis of flexibility of the strap; a gauging member movably mounted on said body member generally along said convex surface; a gauging pin carried on said gauging member with its axis normal to the direction of movement of said member and adapted to engage a second index recess on said convex surface, said gauging pin being axially adjustable with respect to the gauging member, the pivotable mounting of the body member and the axial adjustment of the pin cooperating to position the longitudinal axis of the pin on a projected radius of said plate when the pin is in the recess; indicating means mounted on said body member; and interengaging actuating means on said gauging member and said indicating means for providing an accurate indication on said indicating means of the length of said arcuate surface between said first and second index recesses.

2. A comparison gauge for convex surfaces of arcuate plates, comprising: a strap flexible only about axes perpendicular to its length; a fixed index member secured to one end of said strap and pivotable on an axis of flexibility of the strap; an axially adjustable ball end indexing pin on said index member adapted to engage a first index recess formed on a generally convex surface of an arcuate plate, the pivotable mounting and the axial adjustability cooperating to position the pin with its longitudinal axis on a projected radius of the plate with said band extending along said convex surface; a body member secured to the opposite end of said strap and pivotable on an axis of flexibility of the strap, said body member having a channel formed therein extending generally in a plane normal to the axes of flexibility of said strap and opening away from said opposite end of said strap; a movable gauging member disposed in said channel; a plurality of ball bearings arranged between adjoining edges of said gauging member and channel to render said gauging member freely movable in said channel; a spring-urged plunger adjustably mounted on said gauging member and carrying a ball and gauging pin on one end, said plunger being axially movable on said gauging member normal to the direction of sliding movement thereof so that said ball end pin is adapted to engage a second index recess formed on said convex surface of said arcuate plate with its longitudinal axis on a projected radius of the plate; an indicator mounted on said body member, said indicator having an actuating stem extending longitudinally into said channel; and a stem actuating portion on said movable gauging member engaged with said stem to provide an indication on said indicator of the distance on said convex surface of said arcuate plate between said first and second index recesses.

3. A comparison gauge for arcuate surfaces, comprising: a strap which is flexible only about axes perpendicular to its length anchoring means including a member mounted on and pivotable about an axis of flexibility of the strap, and an axially adjustable pin in said member, said pivotable mounting and axial adjustability cooperating to provide point and adjacent surface anchoring engagement at a first reference recess on the arcuate surface with the longitudinal axis of the pin lying on a projected radius of the arcuate surface when in said first recess; a body member mounted on the opposite end of said strap and pivotable about an axis of flexibility of the strap; a gauging member mounted on said body member for movement in a plane parallel to the axes of flexibility of the strap; a gauging pin carried on said gauging member and axially adjustable thereon, said body member and gauging pin cooperating to provide a point and adjacent surface engagement at a second reference recess on the arcuate surface with the longitudinal axis of the gauging pin lying on a projected radius of the arcuate surface when in said second recess; indicating means mounted on said body member; and interengaging actuating means on said gauging member and said indicating means for providing an accurate indication on said indicating means of the length along the arcuate surface between said first and second reference recesses.

4. The device of claim 3 in which the gauging member includes a sleeve, the gauging pin is slidably mounted in the sleeve and is spring-urged toward its gauging point, and said sleeve has a shoulder adapted to abut a plate surrounding the second reference recess.

5. A comparison gauge for convex surfaces of arcuate plates comprising: a strap which is flexible only about axes perpendicular to its length; means for anchoring one end of said strap at a first predetermined point on a convex surface with the length of the strap extending around the circumference of the surface; a body member secured to the opposite end of the strap; a gauging member linearly movable in said body member in a guideway which may be positioned parallel to a plane tangent to the convex surface at a second predetermined point; indexing means in said gauging member having an indexing element engageable with the plate at said second predetermined point, said indexing means being movable in the gauging member to position said guide way parallel to said plane when the indexing element is engaged with the plate at said second point; and indicating means on the body member operatively connected with said gauging member to provide an indication of the distance on the convex surface between said first and second predetermined points.

6. A comparison gauge for convex surfaces of arcuate plates comprising: a strap which is flexible only about axes perpendicular to its length; means for anchoring one end of said strap at a first predetermined point on a convex surface with the length of the strap extending around the circumference of the surface; a body member secured to the opposite end of the strap; a gauging member linearly movable in said body member in a guideway which may be positioned parallel to a plane tangent to the convex surface at a second predetermined point; an axially adjustable indexing pin in said gauging member with its axis perpendicular to said guideway, said pin being engageable with the plate at said second predetermined point to position said guideway parallel to said plane; and indicating means on the body member operatively connected with said gauging member to provide an indication of the distance on the convex surface between said first and second predetermined points.

7. A comparison gauge for convex surfaces of arcuate plates, comprising: a strap which is flexible only about axes perpendicular to its length; means for anchoring one end of said strap at a predetermined point on a convex surface with the length of the strap extending around the circumference of the surface; a body member mounted on the opposite end of the strap for pivotal movement about an axis of flexibility of the strap; a gauging member linearly movable on said body member generally along said convex surface; a gauging pin in the gauging member which is adjustable perpendicular to the line of movement of said member so as to be engaged with the convex surface and positioned on a projected radius thereof; and indicating means on said body member operatively connected with the gauging member to provide an indication of the distance on said arcuate surface between said anchoring means and the gauging pin.

References Cited in the file of this patent

UNITED STATES PATENTS

| | | |
|---|---|---|
| 2,065,143 | Metcalf | Dec. 22, 1936 |
| 2,335,105 | Browning | Nov. 23, 1943 |
| 2,648,913 | MacKenzie | Aug. 18, 1953 |
| 2,681,510 | Willinger | June 22, 1954 |
| 2,706,338 | Ackerman | Apr. 19, 1955 |